US010318828B2

(12) United States Patent
Hampiholi (10) Patent No.: US 10,318,828 B2
(45) Date of Patent: Jun. 11, 2019

(54) VEHICLE BEHAVIOR ANALYSIS (71) Applicant: Harman International Industries, Incorporated, Stamford, CT (US)

(72) Inventor: Vallabha Hampiholi, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 558 days.

(21) Appl. No.: 14/135,264

(22) Filed: Dec. 19, 2013

(65) Prior Publication Data

US 2015/0178578 A1 Jun. 25, 2015

(51) Int. Cl.
*G06K 9/00* (2006.01)
*G08G 1/16* (2006.01)
*G08G 1/00* (2006.01)
*G08G 1/09* (2006.01)
*G08G 1/052* (2006.01)

(52) U.S. Cl.
CPC ......... *G06K 9/00825* (2013.01); *G08G 1/091* (2013.01); *G08G 1/166* (2013.01); *G08G 1/205* (2013.01); *G08G 1/052* (2013.01); *G08G 1/167* (2013.01)

(58) Field of Classification Search
None
See application file for complete search history.

(56) References Cited

U.S. PATENT DOCUMENTS

2003/0025597 A1 2/2003 Schofield
2005/0012604 A1* 1/2005 Takahashi ............. G01S 13/931
340/435
2006/0244633 A1* 11/2006 Bahn ...................... G08G 1/161
340/902
2008/0046150 A1* 2/2008 Breed ................. B60R 21/0134
701/45
2011/0095908 A1* 4/2011 Nadeem .................. B60H 3/00
340/905

(Continued)

FOREIGN PATENT DOCUMENTS

WO 2005015482 A1 2/2005
WO 2013100993 A1 7/2013

OTHER PUBLICATIONS

Wu, J. et al., "An Algorithm for Automatic Vehicle Speed Detection using Video Camera," Proceedings of the 4th International Conference on Computer Science & Education, Jul. 25, 2009, 4 pages.

(Continued)

*Primary Examiner* — Samira Monshi
(74) *Attorney, Agent, or Firm* — McCoy Russell LLP (57) ABSTRACT

Embodiments are disclosed for identifying potentially erratic vehicles travelling near a vehicle including an in-vehicle computing system. In some embodiments, an in-vehicle computing system for a vehicle includes a processor, a sensor subsystem communicatively coupleable to a camera mounted on the vehicle, and an external device interface communicatively coupleable to an extra-vehicle server. The in-vehicle computing system may also include a storage device storing instructions executable by the processor to monitor neighboring vehicles within a field of view of the camera, identify a potential erratic vehicle, and transmit vehicle information to the extra-vehicle server.

21 Claims, 6 Drawing Sheets

(56) References Cited

U.S. PATENT DOCUMENTS

| | | | | |
|---|---|---|---|---|
| 2011/0234749 | A1* | 9/2011 | Alon | G07C 5/0866 |
| | | | | 348/36 |
| 2013/0010103 | A1* | 1/2013 | Ihara | G08G 1/04 |
| | | | | 348/116 |
| 2013/0158800 | A1 | 6/2013 | Trageser | |
| 2013/0307979 | A1* | 11/2013 | Chen | G08G 1/0175 |
| | | | | 348/148 |
| 2013/0335213 | A1* | 12/2013 | Sherony | G08G 1/167 |
| | | | | 340/439 |
| 2014/0236414 | A1* | 8/2014 | Droz | G05D 1/0055 |
| | | | | 701/28 |
| 2014/0339374 | A1* | 11/2014 | Mian | G08G 1/0175 |
| | | | | 246/473.1 |
| 2015/0039361 | A1* | 2/2015 | Crowther | G06Q 50/01 |
| | | | | 705/7.12 |
| 2015/0307107 | A1* | 10/2015 | Tamari | G07C 5/0808 |
| | | | | 701/32.4 |

OTHER PUBLICATIONS

Generic Car Dashboard Video Camera Vehicle Video Accident Recorder (2.0" 1080P), Amazon.com Webpage, Available as Early as Jan. 6, 2012 at http://www.amazon.com/DashBoard-Camera-Vehicle-Accident-Recorder/dp/B0067XVNTG/ref=cm_cr_pr_product_top?, Accessed Oct. 16, 2013, 6 pages.

Liang, W. et al., "The Speed Detection Algorithm based On Video Sequences," Proceedings of the 2012 International Conference on Computer Science and Service System, Aug. 11, 2012, 4 pages.

HD Portable Car Vehicle HD DVR DV Camcorder Video Camera LCD Screen Recorder-01, Junglee.com Webpage, Available at http://www.junglee.com/Portable-Vehicle-Camcorder-Camera-Recorder/dp/B00E9OHQE6/ref=sr_1_6?s=electronics&ie=UTF8&qid=1377851346&sr=1-6&keywords=car+camera, Accessed Oct. 16, 2013, 1 page.

European Patent Office, Extended European Search Report Issued in Application No. 14196450.2, dated Apr. 22, 2015, 5 pages.

\* cited by examiner

VEHICLE BEHAVIOR ANALYSIS

FIELD

The disclosure relates to analyzing an environment of a vehicle using one or more vehicle-mounted cameras.

BACKGROUND

The safety of each driver on a road often depends on factors outside of the control of the driver. While certain environmental conditions may be detected by the driver such that actions may be made to compensate for difficulties stemming from such conditions, driving behaviors of fellow road occupants may be more unpredictable and more difficult to counteract.

Imaging devices have decreased in size over time, allowing these devices to be integrated in or mounted to various constructs. For example, many vehicles include one or more cameras capable of imaging at least a portion of an environment of a vehicle. Such cameras may also be installed on a vehicle after manufacturing. The vehicle-mounted cameras are often used to assist a driver with tasks such as parking or reversing by providing an image of portions of the environment that may be difficult to see otherwise to a display within the vehicle.

SUMMARY

Embodiments are disclosed for utilizing vehicle-mounted cameras to analyze an environment of a vehicle and alert a driver of the vehicle to errant behavior that is being exhibited by a neighboring vehicle. In some embodiments, an in-vehicle computing system for a vehicle includes a processor, a sensor subsystem communicatively coupleable to a camera mounted on the vehicle, and an external device interface communicatively coupleable to an extra-vehicle server. The in-vehicle computing system may also include a storage device storing instructions executable by the processor to monitor neighboring vehicles within a field of view of the camera, identify a potential erratic vehicle, and transmit vehicle information to the extra-vehicle server.

In additional or alternative embodiments, an in-vehicle computing system for a vehicle includes a processor, a sensor subsystem communicatively coupleable to a camera mounted on the vehicle, and an external device interface communicatively coupleable to an extra-vehicle server. The in-vehicle computing system may also include a storage device storing instructions executable by the processor to, for each neighboring vehicle within a field of view of the camera, capture at least one frame of image data including a license plate of the neighboring vehicle, capture a stream of image data indicating one or more driving behaviors of each neighboring vehicle within the field of view of the camera, and compare the one or more driving behaviors to driving behaviors of the vehicle and/or one or more other neighboring vehicles. The instructions may be further executable to identify a potential erratic vehicle of the neighboring vehicles based on the stream of image data and one or more driving behaviors, and transmit vehicle information corresponding to the potential erratic vehicle to the extra-vehicle server, the vehicle information including an identifier presented on the license plate of the potential erratic vehicle.

In some embodiments, a method of identifying a potential erratic vehicle within a field of view of a camera of a vehicle may include capturing image data including an identifier of each neighboring vehicle within a field of view of the camera, monitoring each neighboring vehicle within the field of view of the camera, and identifying, with an in-vehicle computing system of the vehicle, erratic behavior exhibited by a potential erratic vehicle of the neighboring vehicles. The method may further include transmitting vehicle information for the potential erratic vehicle to a server.

BRIEF DESCRIPTION OF THE DRAWINGS

The disclosure may be better understood from reading the following description of non-limiting embodiments, with reference to the attached drawings, wherein below.

DETAILED DESCRIPTION

As described above, vehicles often include one or more cameras to image an environment of the vehicle. By leveraging the imaging capabilities of these cameras and providing captured image data to a video analytics module of an in-vehicle computing system (e.g., an infotainment system and/or a head unit for an infotainment system in a vehicle), information regarding potentially dangerous driving behavior of neighboring vehicles may be determined. Upon determining the presence of potentially dangerous driving behavior, the in-vehicle computing system may provide an alert to the driver, as well as any other suitable parties, to enable the driver to adapt to the potentially dangerous conditions.

Figure 1:
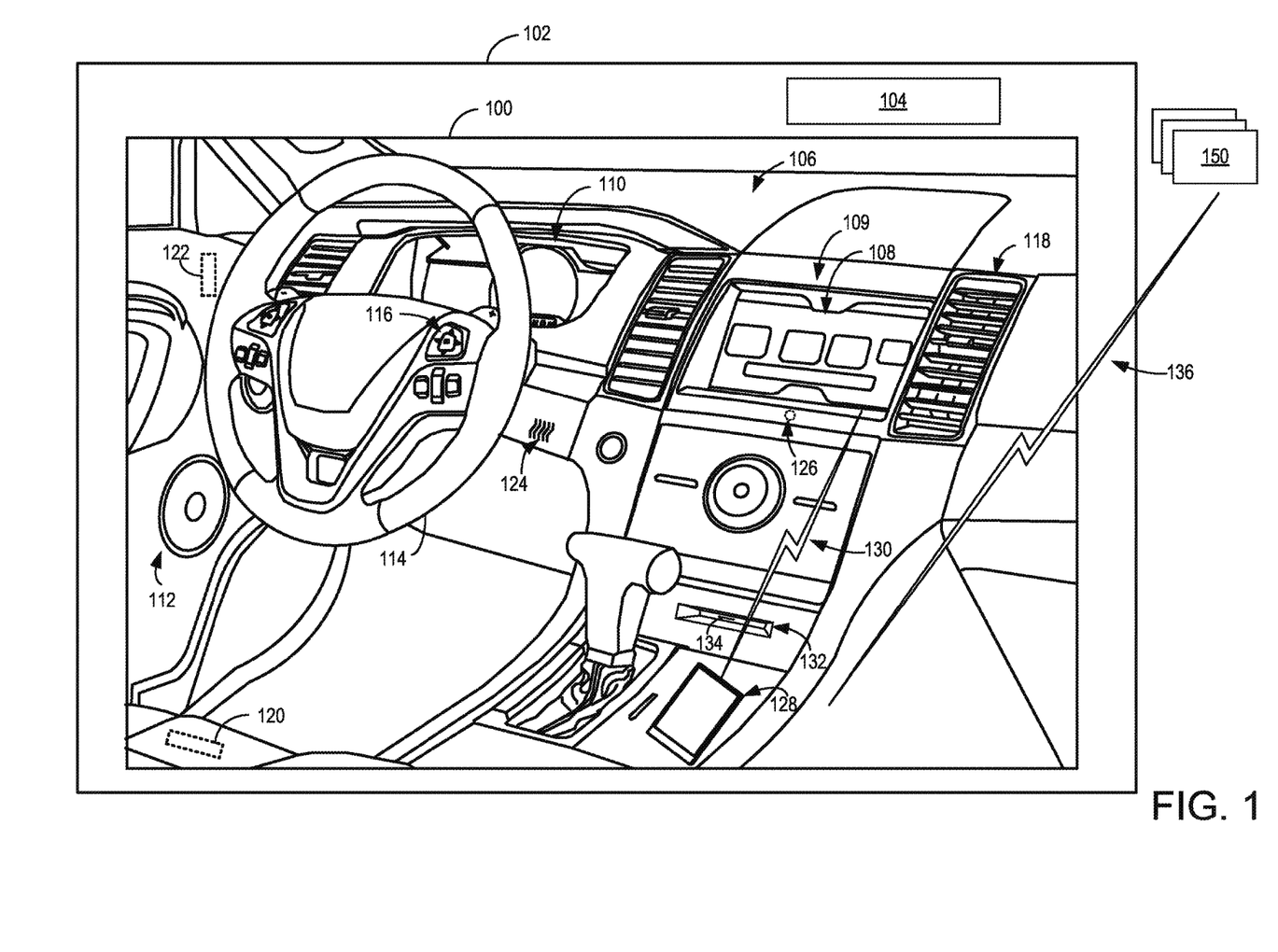
FIG. 1 is a partial view of a vehicle cabin including an in-vehicle computing system communicatively coupled to a mobile device and a wearable device, in accordance with one or more embodiments of the present disclosure.

FIG. 1 shows an example partial view of an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

Instrument cluster 110 may include various gauges such as a fuel gauge, tachometer, speedometer, and odometer, as well as indicators and warning lights. A steering wheel 114 may project from the instrument panel below instrument cluster 110. Optionally, steering wheel 114 may include controls 116 which may be used in conjunction with touch screen 108 to navigate features of an in-vehicle computing system and to control the in-vehicle computing system. In addition to the components depicted in FIG. 1, it will be appreciated that instrument panel 106 may include additional components such as door and window controls, a cigarette lighter which may also be used as a low-voltage power outlet, a glove compartment, and/or any other suitable elements. In one or more embodiments, control of in-vehicle climate (such as cabin temperature) via climate control system vents 118 may be performed using touch screen 108 and thus no separate climate control interface may be included in instrument panel 106. In alternative embodiments, however, a separate climate control interface may be provided.

The cabin 100 may include one or more sensors for monitoring the vehicle, the user, and/or the environment. For example, the cabin 100 may include one or more seat-mounted pressure sensors 120 configured to measure the pressure applied to the seat to determine the presence of a user. The cabin 100 may include one or more door sensors 122 configured to monitor door activity, such as the opening and/or closing of the door, the locking of the door, the operation of a window of the door, and/or any other suitable door activity event. A humidity sensor 124 may be included to measure the humidity content of the cabin. A microphone 126 may be included to receive user input in the form of voice commands, to enable a user to conduct telephone calls, and/or to measure ambient noise in the cabin 100. It is to be understood that the placement of the sensors illustrated in FIG. 1 is exemplary, and one or more additional or alternative sensors may be positioned in any suitable location of the vehicle. For example, additional sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

While the mobile device 128 is illustrated as being spatially separated from the in-vehicle computing system and connected via a substantially external communication link (e.g., a cable or radiofrequency signal), it is to be understood that a slot 132 or other storage structure may be formed in the instrument panel 106 or other location in the vehicle to hold the mobile device in a particular location. The storage structure may include an integrated connector 134 to which the mobile device 128 may be attached or "docked" for providing a substantially internal communication link between the mobile device and the computing system.

In-vehicle computing system 109 may also be communicatively coupled to additional devices operated by the user but located external to vehicle 102, such as one or more external devices 150. In the depicted embodiment, external devices 150 are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
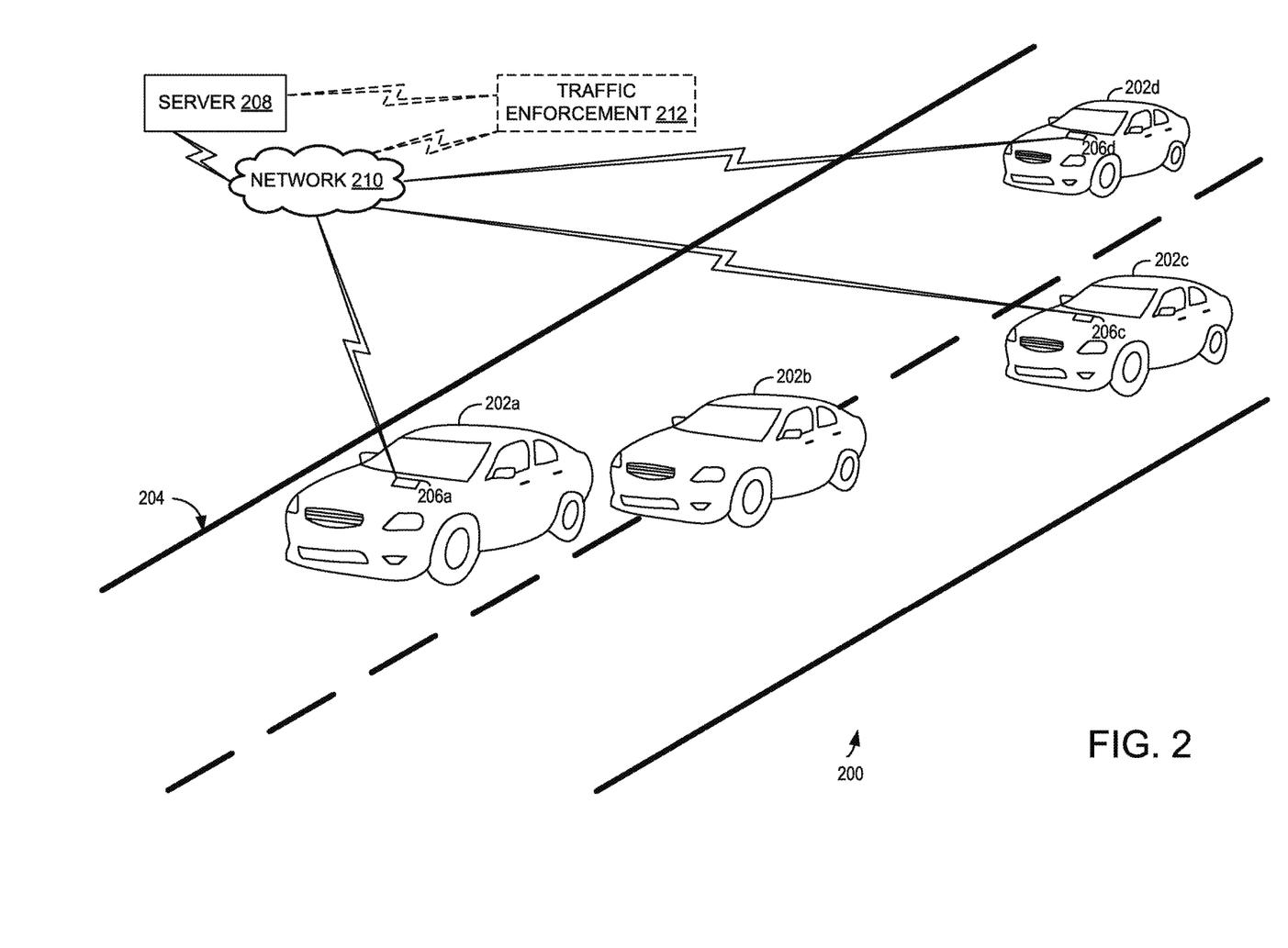
FIG. 2 shows a schematic representation of a driving environment including an erratic vehicle, in accordance with one or more embodiments of the present disclosure.

FIG. 2 shows an example driving environment 200, including multiple vehicles 202a, 202b, 202c, and 202d traversing a road 204. Vehicles 202a, 202c, and 202d may include a camera to monitor neighboring vehicles and an in-vehicle computing system 206 to analyze the image data from the cameras and communicate with a server 208 (e.g., via network 210) to determine errant behaviors exhibited by a neighboring vehicle. For example, as illustrated, vehicle 202b is driving in the middle of two lanes and appears to be driving closely to vehicle 202a. Each vehicle may identify information about neighboring vehicles (e.g., a license plate and/or tag/plate number), and monitor the identified vehicles to determine behaviors such as acceleration, braking, lane changes, speed, and/or other driving characteristics that may be indicative of erratic driving behaviors. Image data from rear- and/or front-facing cameras of vehicles 202a, 202c, and 202d may be sent to the server 208 for processing and/or verification to determine whether a vehicle (e.g., vehicle 202b) is driving erratically. In some embodiments, the image data may be sent to a mobile device (e.g., a mobile device within a vehicle, such as mobile device 128 of FIG. 1, and/or a mobile device external to the vehicle). Image data sent to a mobile device may be transmitted to the server 208 via the mobile device with no further processing in some embodiments, while in other embodiments, the mobile device may partially or fully process the image data to determine erratic vehicles. In embodiments in which the mobile device partially or fully processes the image data, the image data and/or processed image data may not be sent to the server.

In the illustrated example, front-facing cameras of vehicles 202d and 202c may capture image data showing the vehicle 202b traversing outside of a designated lane for a long period of time, while a rear-facing camera of vehicle 202a may provide image data showing the vehicle 202b driving less than a safe distance away from the vehicle 202a. Upon receiving image data from multiple vehicles indicating erratic behavior of vehicle 202b, the server 208 may send information to each of the vehicles 202a, 202c, and 202d alerting the vehicles to the presence and/or particular erratic behavior exhibited by vehicle 202b. The server 208 may optionally send information to a law or traffic enforcement agency 212 and/or to one or more mobile devices identifying the erratic vehicle 202b. The server 208 may utilize identifying information of the vehicle (e.g., a license plate and/or tag/plate number, make/model, color, etc.) to consult a database associated with the law or traffic enforcement agency 212. For example, the server 208 may utilize the identifying information to determine whether the vehicle has been reported stolen, or a register driver of the vehicle has an outstanding warrant. The law or traffic enforcement agency 212, the server 208, and/or in-vehicle computing system of the vehicles may encrypt data and/or provide other security measures to ensure that only data available for public viewing is accessible by the server/observing vehicles and/or that only authorized personnel are permitted to view protected data.

Figure 3:
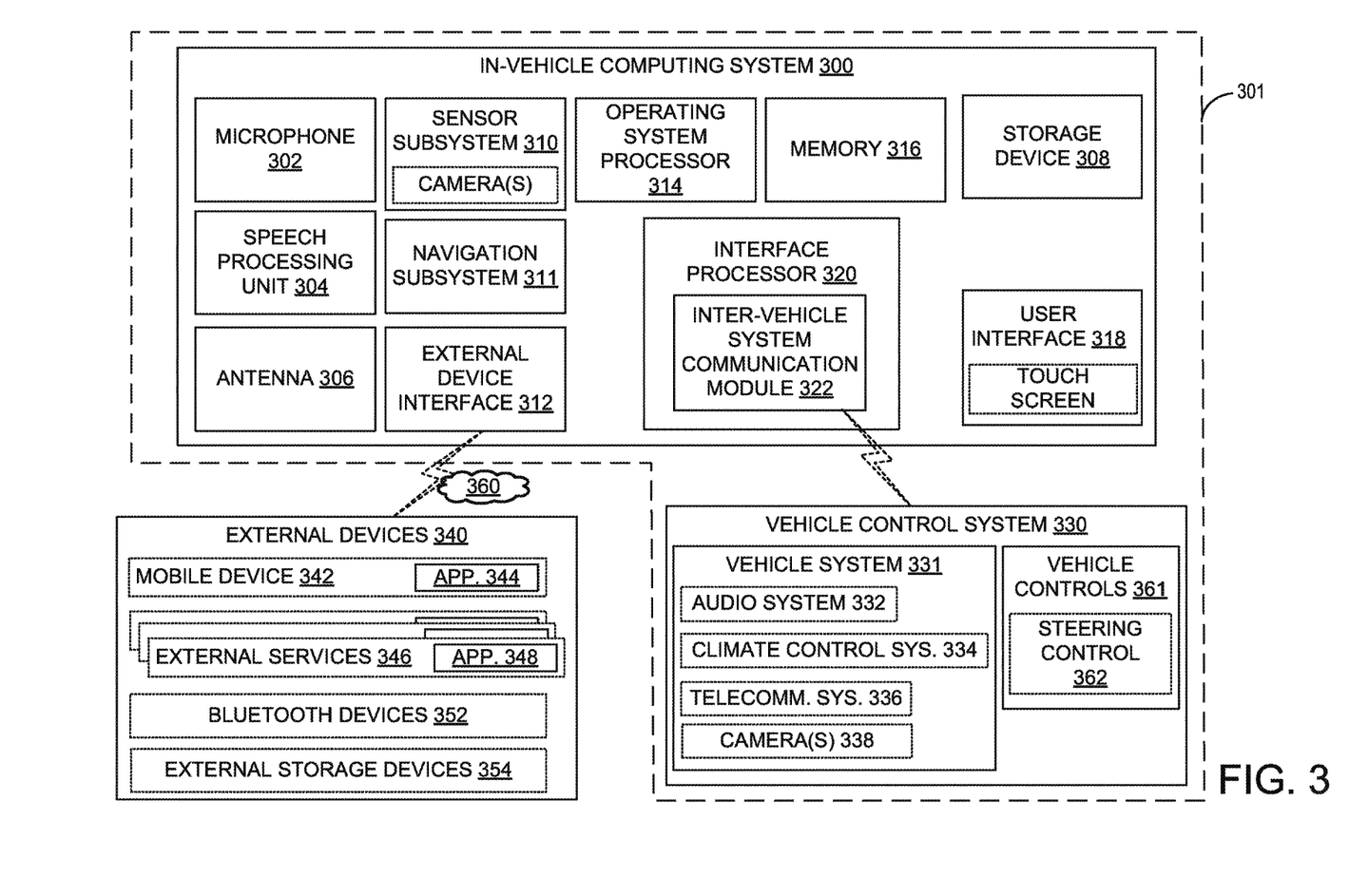
FIG. 3 shows a block diagram of an in-vehicle computing system, in accordance with one or more embodiments of the present disclosure.

FIG. 3 shows a block diagram of an in-vehicle computing system 300 configured and/or integrated inside vehicle 301. In-vehicle computing system 300 may be an example of in-vehicle computing system 109 of FIGS. 1 and 2 in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 301 in order to enhance an in-vehicle experience for a driver and/or a passenger.

In-vehicle computing system 300 may include one or more processors including an operating system processor 314 and an interface processor 320. Operating system processor 314 may execute an operating system on the in-vehicle computing system, and control input/output, display, playback, and other operations of the in-vehicle computing system. Interface processor 320 may interface with a vehicle control system 330 via an inter-vehicle system communication module 322.

Inter-vehicle system communication module 322 may output data to other vehicle systems 331 and vehicle control elements 361, while also receiving data input from other vehicle components and systems 331, 361, e.g. by way of vehicle control system 330. When outputting data, inter-vehicle system communication module 322 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 308 may be included in in-vehicle computing system 300 to store data such as instructions executable by processors 314 and 320 in non-volatile form. The storage device 308 may store application data to enable the in-vehicle computing system 300 to run an application for connecting to and/or pairing with a mobile device and/or a wearable device. The application may then retrieve user information gathered by the mobile device and the wearable device. In-vehicle computing system 300 may further include a volatile memory 316. Volatile memory 316 may be random access memory (RAM). Non-transitory storage devices, such as non-volatile storage device 308 and/or volatile memory 316, may store instructions and/or code that, when executed by a processor (e.g., operating system processor 314 and/or interface processor 320), controls the in-vehicle computing system 300 to perform one or more of the actions described in the disclosure.

A microphone 302 may be included in the in-vehicle computing system 300 to receive voice commands from a user and/or to measure ambient noise in the vehicle, and a speech processing unit 304 may process the received voice commands. In some embodiments, in-vehicle computing system 300 may also be able to receive voice commands and sample ambient vehicle noise using a microphone included in an audio system 332 of the vehicle.

One or more additional sensors may be included in a sensor subsystem 310 of the in-vehicle computing system 300. For example, the sensor subsystem 310 may include a camera, such as a rear view camera for assisting a user in parking the vehicle. Sensor subsystem 310 of in-vehicle computing system 300 may communicate with and receive inputs from various vehicle sensors and may further receive user inputs. For example, the inputs received by sensor subsystem 310 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 310 alone, other sensors may communicate with both sensor subsystem 310 and vehicle control system 330, or may communicate with sensor subsystem 310 indirectly via vehicle control system 330. A navigation subsystem 311 of in-vehicle computing system 300 may generate and/or receive navigation information such as location information (e.g., via a GPS sensor and/or other sensors from sensor subsystem 310), route guidance, traffic information, point-of-interest (POI) identification, and/or provide other navigational services for the driver.

External device interface 312 of in-vehicle computing system 300 may be coupleable to and/or communicate with one or more external devices 340 located external to vehicle 301. While the external devices are illustrated as being located external to vehicle 301, it is to be understood that they may be temporarily housed in vehicle 301, such as when the user is operating the external devices while operating vehicle 301. In other words, the external devices 340 are not integral to vehicle 301. The external devices 340 may include a mobile device 342 (e.g., connected via a Bluetooth connection) or an alternate Bluetooth-enabled device 352. Mobile device 342 may be a mobile phone, smart phone, wearable devices/sensors that may communicate with the in-vehicle computing system via wired and/or wireless communication, or other portable electronic device(s). Other external devices include external services 346, such as server 208 of FIG. 2. For example, the external devices may include extra-vehicular devices that are separate from and located externally to the vehicle. Still other external devices include external storage devices 354, such as solid-state drives, pen drives, USB drives, etc. External devices 340 may communicate with in-vehicle computing system 300 either wirelessly or via connectors without departing from the scope of this disclosure. For example, external devices 340 may communicate with in-vehicle computing system 300 through the external device interface 312 over network 360, a universal serial bus (USB) connection, a direct wired connection, a direct wireless connection, and/or other communication link. The external device interface 312 may provide a communication interface to enable the in-vehicle computing system to communicate with mobile devices associated with contacts of the driver. For example, the external device interface 312 may enable phone calls to be established and/or text messages (e.g., SMS, MMS, etc.) to be sent (e.g., via a cellular communications network) to a mobile device associated with a contact of the driver.

One or more applications 344 may be operable on mobile device 342. As an example, mobile device application 344 may be operated to aggregate user data regarding interactions of the user with the mobile device. For example, mobile device application 344 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 344 to external device interface 312 over network 360. In addition, specific user data requests may be received at mobile device 342 from in-vehicle computing system 300 via the external device interface 312. The specific data requests may include requests for determining where the user is geographically located, an ambient noise level and/or music genre at the user's location, an ambient weather condition (temperature, humidity, etc.) at the user's location, etc. Mobile device application 344 may send control instructions to components (e.g., microphone, etc.) or other applications (e.g., navigational applications) of mobile device 342 to enable the requested data to be collected on the mobile device. Mobile device application 344 may then relay the collected information back to in-vehicle computing system 300.

Likewise, one or more applications 348 may be operable on external services 346. As an example, external services applications 348 may be operated to aggregate and/or analyze data from multiple data sources. For example, external services applications 348 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context and a pre-defined rule set. An example method of determining an action to be performed by an in-vehicle computing system is discussed with reference to FIGS. 5A-5C.

Vehicle control system 330 may include controls for controlling aspects of various vehicle systems 331 involved in different in-vehicle functions. These may include, for example, controlling aspects of vehicle audio system 332 for providing audio entertainment to the vehicle occupants, aspects of climate control system 334 for meeting the cabin cooling or heating needs of the vehicle occupants, as well as aspects of telecommunication system 336 for enabling vehicle occupants to establish telecommunication linkage with others. The vehicle control system 330 may additionally or alternatively include controls for controlling aspects of one or more cameras 338 mounted on or integrated with the vehicle. For example, the vehicle control system 330 may instruct the camera(s) 338 to start/stop capturing image data, to physically move or change orientation, to change focus, and/or to adjust any suitable function related to capturing image data.

Audio system 332 may include one or more acoustic reproduction devices including electromagnetic transducers such as speakers. Vehicle audio system 332 may be passive or active such as by including a power amplifier. In some examples, in-vehicle computing system 300 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 334 may be configured to provide a comfortable environment within the cabin or passenger compartment of vehicle 301. Climate control system 334 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 330 may also include controls for adjusting the settings of various vehicle controls 361 (or vehicle system control elements) related to the engine and/or auxiliary elements within a cabin of the vehicle, such as steering wheel controls 362 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. The control signals may also control audio output at one or more speakers of the vehicle's audio system 332. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 334. For example, the control signals may increase delivery of cooled air to a specific section of the cabin.

Control elements positioned on an outside of a vehicle (e.g., controls for a security system) may also be connected to computing system 300, such as via communication module 322. The control elements of the vehicle control system may be physically and permanently positioned on and/or in the vehicle for receiving user input. In addition to receiving control instructions from in-vehicle computing system 300, vehicle control system 330 may also receive input from one or more external devices 340 operated by the user, such as from mobile device 342. This allows aspects of vehicle systems 331 and vehicle controls 361 to be controlled based on user input received from the external devices 340.

In-vehicle computing system 300 may further include an antenna 306. Antenna 306 is shown as a single antenna, but may comprise one or more antennas in some embodiments. The in-vehicle computing system may obtain broadband wireless internet access via antenna 306, and may further receive broadcast signals such as radio, television, weather, traffic, and the like. The in-vehicle computing system may receive positioning signals such as GPS signals via one or more antennas 306. The in-vehicle computing system may also receive wireless commands via RF such as via antenna (s) 306 or via infrared or other means through appropriate receiving devices. In some embodiments, antenna 306 may be included as part of audio system 332 or telecommunication system 336. Additionally, antenna 306 may provide AM/FM radio signals to external devices 340 (such as to mobile device 342) via external device interface 312.

One or more elements of the in-vehicle computing system 300 may be controlled by a user via user interface 318. User interface 318 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 300 and mobile device 342 via user interface 318. In addition to receiving a user's vehicle setting preferences on user interface 318, vehicle settings selected by in-vehicle control system may be displayed to a user on user interface 318. Notifications and other messages, as well as navigational assistance, may be displayed to the user on a display of the user interface. As elaborated below with respect to FIGS. 5A-5C, confirmation of actions performed in response to an event (e.g., based on a rule set) may be performed via user input to the user interface.

Figure 4:
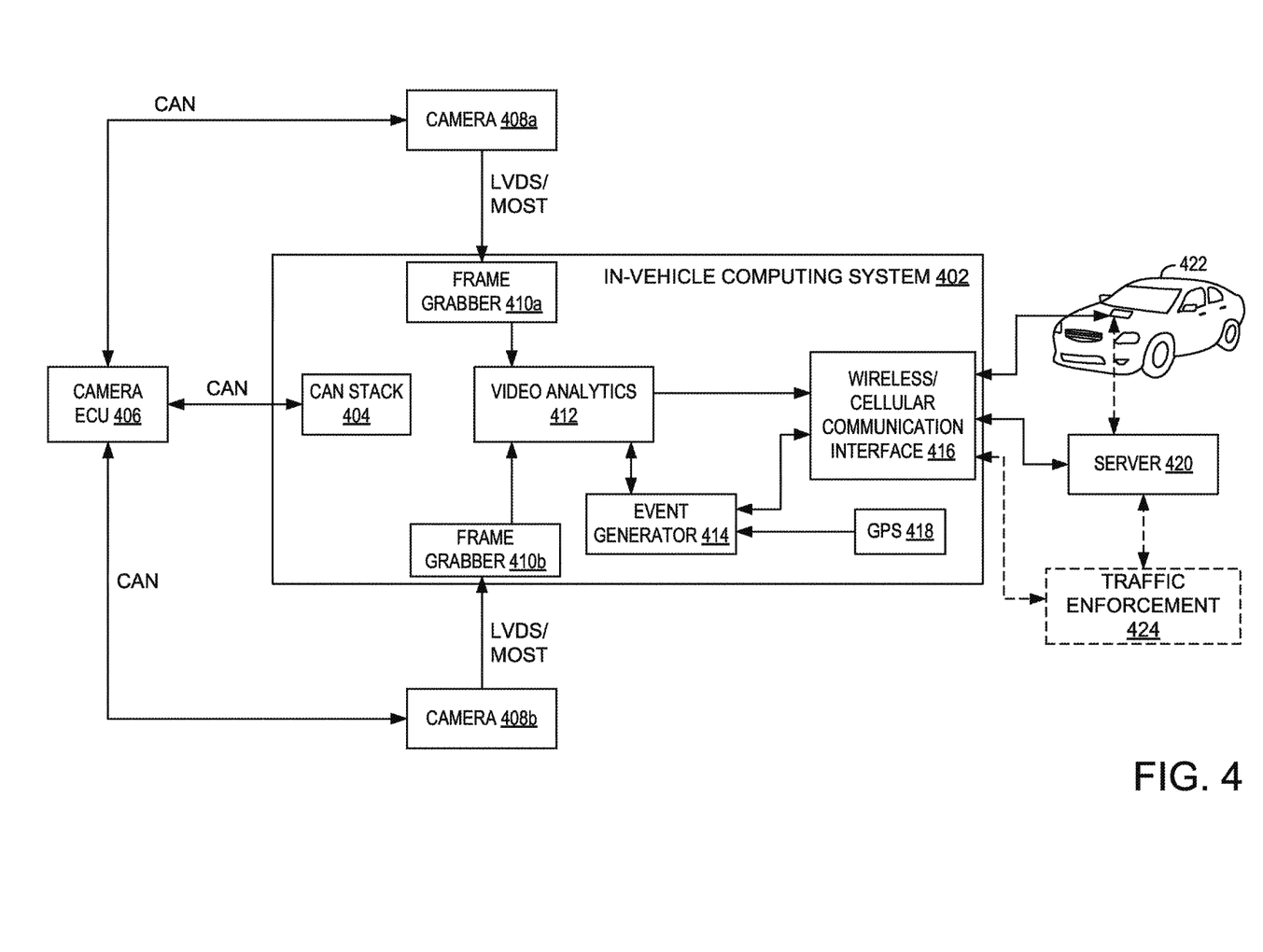
FIG. 4 schematically shows an environment for capturing and analyzing image data corresponding to erratic driving behaviors of a neighboring vehicle, in accordance with one or more embodiments of the present disclosure.

FIG. 4 schematically shows an environment 400 for capturing and analyzing image data corresponding to erratic driving behaviors of a neighboring vehicle. For example, communication links between various elements of an in-vehicle computing system 402 and other devices for analyzing an environment of a vehicle are illustrated. For clarity, only components of the in-vehicle computing system 402 that are directly associated with observation and analysis of driving behaviors of neighboring vehicles are illustrated. It is to be understood that the in-vehicle computing system 402 may include all or some of the elements described with respect to the in-vehicle computing system 300 of FIG. 3, and one or more of the components illustrated in FIG. 4 may be included in the components of the in-vehicle computing system 300 of FIG. 3.

The in-vehicle computing system may include a CAN stack 404 that temporarily stores and/or collects control signals to be sent to a CAN bus of the vehicle. In some embodiments, the CAN stack 404 may include and/or be included within the memory 316 of FIG. 3, the operating system processor 314, the interface processor 320, and/or any other suitable module of the in-vehicle computing system 402. As illustrated, the CAN stack 404 may send instructions via the CAN bus to an electronic control unit (ECU) 406 for controlling operation of one or more cameras 408a and 408b. Although illustrated outside of the in-vehicle computing system 402, it is to be understood that the ECU 406 may be included in the in-vehicle computing system 402 (e.g., within the interface processor 320 and/or sensor subsystem 310 of FIG. 3). The ECU 406 may process and/or pass along the control signals to one or more of the cameras 408a and 408b (e.g., as identified in the control signals) via the CAN bus.

The cameras 408a and 408b may provide image data to an associated frame grabber 410a and 410b. In some embodiments, a single frame grabber may receive image data from both cameras, while in the illustrated example, frame grabber 410a receives image data from camera 408a and frame grabber 410b receives image data from camera 408b. The cameras may send image data over any suitable communication link, including but not limited to a low-voltage differential signaling (LVDS) link, media oriented systems transport (MOST) link, etc. The frame grabbers 410a and 410b may capture and store individual frames from a stream of image data received from a respective camera. In this way, the frame grabbers 410a and 410b may separate a stream of image data into individual frames. In some embodiments, the frame grabbers may compress the image data to reduce the storage space utilized by the image data and/or to increase the speed of transfer of the image data. The frame grabbers may include and/or be included in the sensor subsystem 310 of FIG. 3, the interface processor 320 of FIG. 3, and/or any other suitable module of the in-vehicle computing system 402.

The frame grabbers 410a and 410b may transmit the captured frames of image data to a video analytics module 412 for processing. In embodiments in which the in-vehicle computing system 402 performs at least some processing of the image data to determine whether a potential erratic vehicle is identified, the video analytics module 412 may identify vehicles within each frame of image data and determine speed, acceleration, and lane change behaviors based on locations of the vehicles identified in the frames of image data. Based on such processing, the video analytics module 412 may provide information and/or pass the image data along to an event generator 414 and/or directly to a wireless/cellular communication interface 416. In embodiments in which the in-vehicle computing system 402 does not determine whether a potential erratic vehicle is identified, the video analytics engine 412 may pass along the image data without processing the data, or may only process the image data for encoding/decoding and/or data transport considerations before passing along the image data to the event generator 414 and/or the wireless/cellular communication interface 416.

The event generator 414 may receive information from a GPS module 418, the wireless/cellular communication interface 416, and/or the video analytics module 412 in order to generate a signal indicating a presence of an erratic or a potentially erratic vehicle and/or details regarding the erratic or potentially erratic vehicle. For example, based on the image data as processed by the video analytics module 412 to confirm that a particular event (e.g., the presence of an erratic or potentially erratic vehicle) has occurred, the event generator may send an indication of this event along with image data and/or other information related to the potentially erratic vehicle (e.g., location data received from the GPS module 418, erratic vehicle identification, vehicle registration information for the observing vehicle, event details, etc.) to the wireless/cellular communication interface 416 to be sent to a server 420 or other external device. The event generator 414 may additionally or alternatively send information to the video analytics module 412 to trigger analysis of the image data and/or to adjust the analysis performed by the module (e.g., provide contextual information received from the GPS module 418 and/or the wireless/cellular communication interface 416). The GPS module 418 may be included in and/or include the navigation subsystem 311 of FIG. 3, and the event generator 414 may be included in and/or include one or more of the processors of FIG. 3 and/or any suitable module of the in-vehicle computing system 402.

In embodiments in which all or some of the image analysis to determine the presence of an erratic vehicle is performed on a server or other external device(s) (e.g., a mobile computing device within the observing vehicle), information from the GPS module 418 and image data may be streamed (e.g., continuously and/or in real-time) to the server or other external device(s) for processing. Additional information, such as vehicle registration information for the observing vehicle to uniquely identify that vehicle as the source of the image data stream, may be sent to the server or other external device(s) before, during, and/or after sending the image data and location information. The server or other external device(s) may generate events responsive to identifying erratic behavior in the image data and send an indication of any generated events to the in-vehicle computing system 402.

In embodiments in which the server or other external device(s) includes a mobile computing device, such as a smart phone within the observing vehicle, the image data may be streamed over a wired or wireless connection (e.g., Bluetooth, USB, Wi-Fi, etc.) to the mobile computing device. The mobile computing device may generate the event information identifying an erratic vehicle and send the information relating to the event to the in-vehicle computing system. The in-vehicle computing system may, in turn, send the event information to the server 420 or other external device via the wireless/cellular communication interface 416. In other embodiments, the mobile computing device may include an application that, when executed, is configured to send the event information directly to the server 420 or other external device, along with GPS information from a GPS module in the mobile computing device and/or the GPS module 418, without sending the information to the in-vehicle computing system 402.

The wireless/cellular communication interface 416 may transmit and/or receive information from the server 420, a neighboring vehicle 422, and/or any other suitable external device. In some embodiments, the wireless/cellular communication interface 416 may send and/or receive information from a computing device associated with a law or traffic enforcement agency 424. The law or traffic enforcement agency 424 may be alerted to erratic vehicles that exhibit behaviors identified as erratic by a threshold number of vehicles in order to allow the agency to mitigate potentially dangerous driving situations (e.g., by sending a nearby law or traffic enforcement vehicle to observe and/or investigate the identified erratic vehicle). In some embodiments, the server 420 may perform all or some of the processing of the image data to determine and/or verify that a particular vehicle is exhibiting erratic behavior. Accordingly, the server 420 may send information (e.g., alerts) to the in-vehicle computing system 402, the neighboring vehicle(s) 422, and/or the law or traffic enforcement agency 424 indicating the presence and/or characteristics of the erratic vehicle. The wireless/cellular communication interface may include and/or be included in the external device interface 312 of FIG. 3 and/or any suitable module of the in-vehicle computing system 402. The server 420 and the computing device of the law or traffic enforcement agency 424 may be examples of the external device 340 of FIG. 3.

Figure 5:
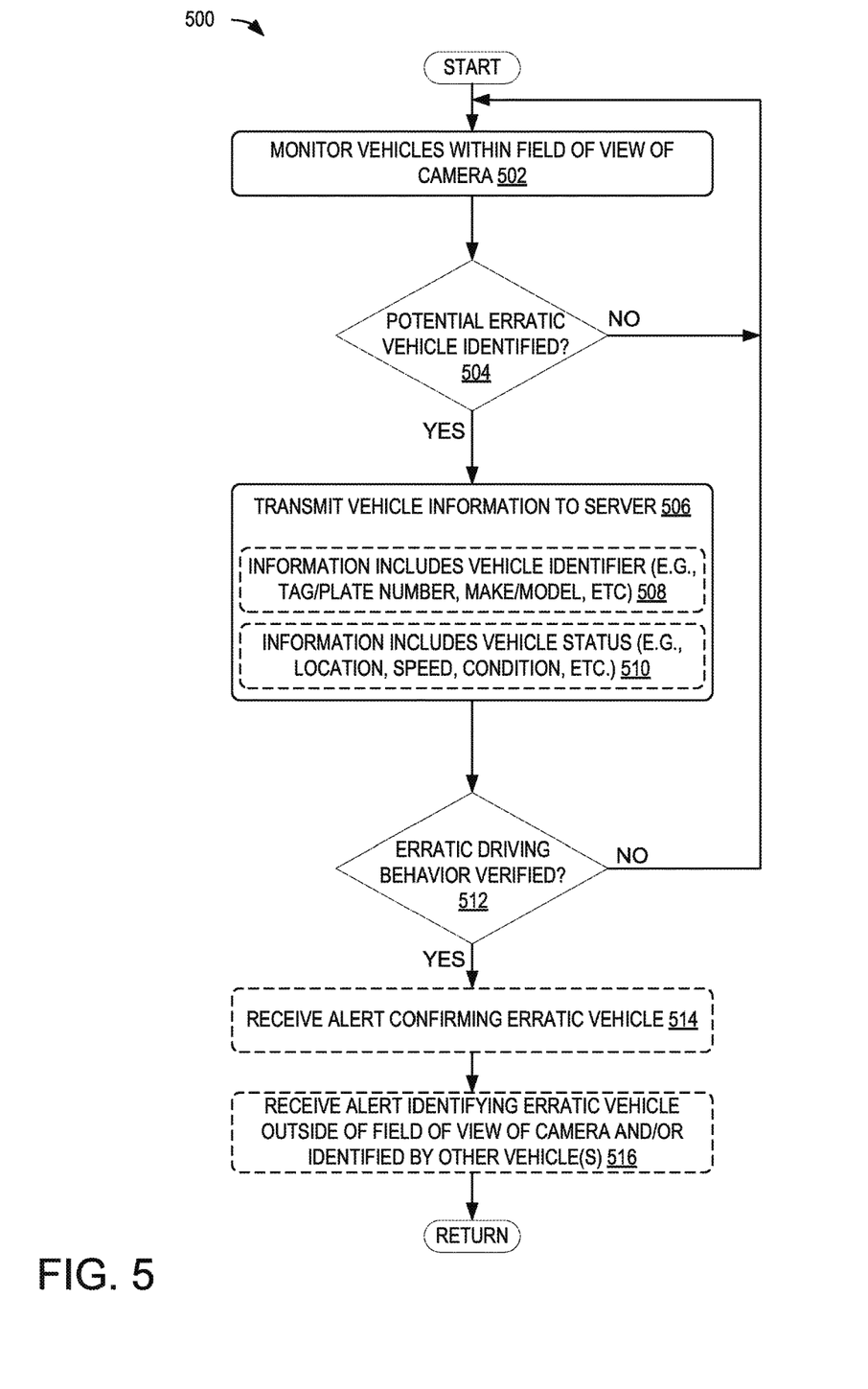
FIG. 5 is a flow chart of a method analyzing an environment of a vehicle, in accordance with one or more embodiments of the present disclosure.

FIG. 5 is a flow chart of a method 500 for analyzing an environment of a vehicle and alerting a driver of the vehicle to potentially dangerous conditions based on determined erratic driving behavior of a neighboring vehicle. The method 500 may be performed by one or more modules of an in-vehicle computing system, such as in-vehicle computing system 300 of FIG. 3. At 502, the method 500 includes monitoring vehicles within a field of view of a camera. For example, the camera may be mounted on and/or integrated with a first, observing vehicle. The vehicles that are monitored may be neighboring vehicles that are near the observing vehicle, and monitoring the neighboring vehicles may include imaging an environment of the observing vehicle including the neighboring vehicles.

At 504, the method 500 includes determining whether a potential erratic vehicle is identified. For example, a potential erratic vehicle may be identified when image data including a neighboring vehicle provides evidence that the neighboring vehicle is accelerating erratically, performing frequent lane departures/changes, frequent braking, erratically overtaking other vehicles, etc. Erratic behavior may be determined based on the behavior of the observing vehicle and/or one or more other neighboring vehicles compared to one another. For example, frequent braking from one neighboring vehicle may not be determined to be erratic when one or more other neighboring vehicles are also braking frequently. A condition of the vehicle may be shown in image data captured from the cameras and utilized to determine whether the vehicle is a potential erratic vehicle. For example, tire punctures, incompletely closed doors, heavy or improperly secured (e.g., shifting) vehicle loads, non-functioning lights, and/or other vehicle conditions may indicate a potential erratic vehicle. In some embodiments, an environment of neighboring vehicles may be monitored and analyzed to determine whether a vehicle is a potential erratic vehicle. For example, image data showing extreme behavior, such as violent actions, around the neighboring vehicle may be interpreted as evidence of a potential erratic vehicle. Additional sensors may be utilized to determine erratic driving characteristics, such as an audio recording device to measure ambient noise.

The identification of a potential erratic vehicle may be based on the presence of a single indicator of a potential erratic vehicle (e.g., one of the examples provided above) or a threshold number of such indicators. Some indicators may be weighted, such that more or fewer indicators are needed to identify a vehicle as a potential erratic vehicle based on the weighting of each indicator. For example, a vehicle may be determined to be a potential erratic vehicle if the vehicle only exhibits erratic acceleration, while the vehicle may not be determined to be potentially erratic if the vehicle is only determined to have a passenger door slightly ajar.

If a potential erratic vehicle is not identified (e.g., "NO" at 504), the method 500 returns to 502 to continue monitoring vehicles. Conversely, if a potential erratic vehicle is identified (e.g., "YES" at 504), the method 500 proceeds to 506 to transmit vehicle information to a server. The vehicle information may include a vehicle identifier for the erratic vehicle, such as a license plate and/or tag/plate number imaged by the camera of the observing vehicle, a make and/or model of the erratic vehicle, a color of the erratic vehicle, and/or any other suitable information to identify the erratic vehicle. The vehicle information may also include dynamic status information regarding behavior of the erratic vehicle, such as a location, speed, condition of the erratic vehicle, erratic behaviors witnessed by the observing vehicle, etc.

While 506 includes transmitting vehicle information to a server, the vehicle information may be sent to a mobile device and/or to the server via a mobile device. It is to be understood that the determination of an erratic vehicle may be performed by the in-vehicle computing system, the server, the mobile device, and/or a combination of the in-vehicle computing system, the server, and/or the mobile device. For example, the in-vehicle computing system may transmit all image data to the server, without determining whether an erratic vehicle is identified, in some embodiments. In other embodiments, the in-vehicle computing system may analyze the image data to determine if erratic behavior is possible (e.g., if a potential erratic vehicle is identified), while the server may perform additional analysis to determine the presence of an erratic vehicle. In still other embodiments, some or all of the analysis may be performed on the mobile device.

At 512, the method 500 includes determining whether erratic driving behavior is verified. For example, verification may be performed by comparing the image data to image data received from other observing vehicles that have captured image data corresponding to the same potential erratic vehicle (e.g., within the server and/or the mobile device). By relying on data from multiple vehicles, errors due to blackout (e.g., camera damage, power issues, etc.) in one observing vehicle may be corrected. The erratic driving behavior may be verified when a threshold number of observing vehicles identify the same vehicle as being a potential erratic vehicle and/or provide image data showing that vehicle exhibiting erratic driving behavior. In some embodiments, the threshold may additionally or alternatively include a threshold amount of evidence of erratic driving behavior (e.g., a threshold number of erratic behaviors are identified). For example, a potential erratic vehicle that exhibits only erratic braking may not be verified, while a potential erratic vehicle that exhibits both erratic braking and frequent lane departures may be verified. The threshold may be pre-defined, and/or may vary based on one or more environmental factors, operating conditions, etc. For example, a threshold number of observing vehicles may be lower for observing vehicles traversing a small (e.g., 2 lane) roadway than observing vehicles traversing a large (e.g., 4 lane) roadway. As another example, a threshold number of erratic behaviors may be higher during relatively heavy traffic conditions than the threshold number of erratic behaviors during relatively light traffic conditions.

If the erratic driving behavior is not verified (e.g., "NO" at 512), the method 500 returns to 502 to continue monitoring vehicles. Conversely, if the erratic driving behavior is verified (e.g., "YES" at 512), the method 500 may optionally proceed to 514 to receive an alert confirming the presence of the erratic vehicle. For example, the alert may include a visual and/or auditory alert presented on a display of the observing vehicle and/or via speakers of the observing vehicle. The alert may include a general advisory of the presence of an erratic vehicle and/or detailed information identifying the particular erratic vehicle (e.g., one or more vehicle identifiers), vehicle status, and/or erratic behaviors that were verified. Similar alerts may be sent to other vehicles that are within a threshold distance from the last known or estimated location of the erratic vehicle. The threshold distance may be predetermined and/or may be based on a determined speed of the erratic vehicle (e.g., the threshold distance may be larger for a relatively faster speed than for a relatively slower speed). Accordingly, at 516, the method 500 may include receiving an alert identifying erratic vehicle(s) that are outside of a field of view of the camera and/or that are identified by other vehicle(s). For example, the alert may identify erratic vehicles that were not identified as potential erratic vehicles by the vehicle.

Figure 6:
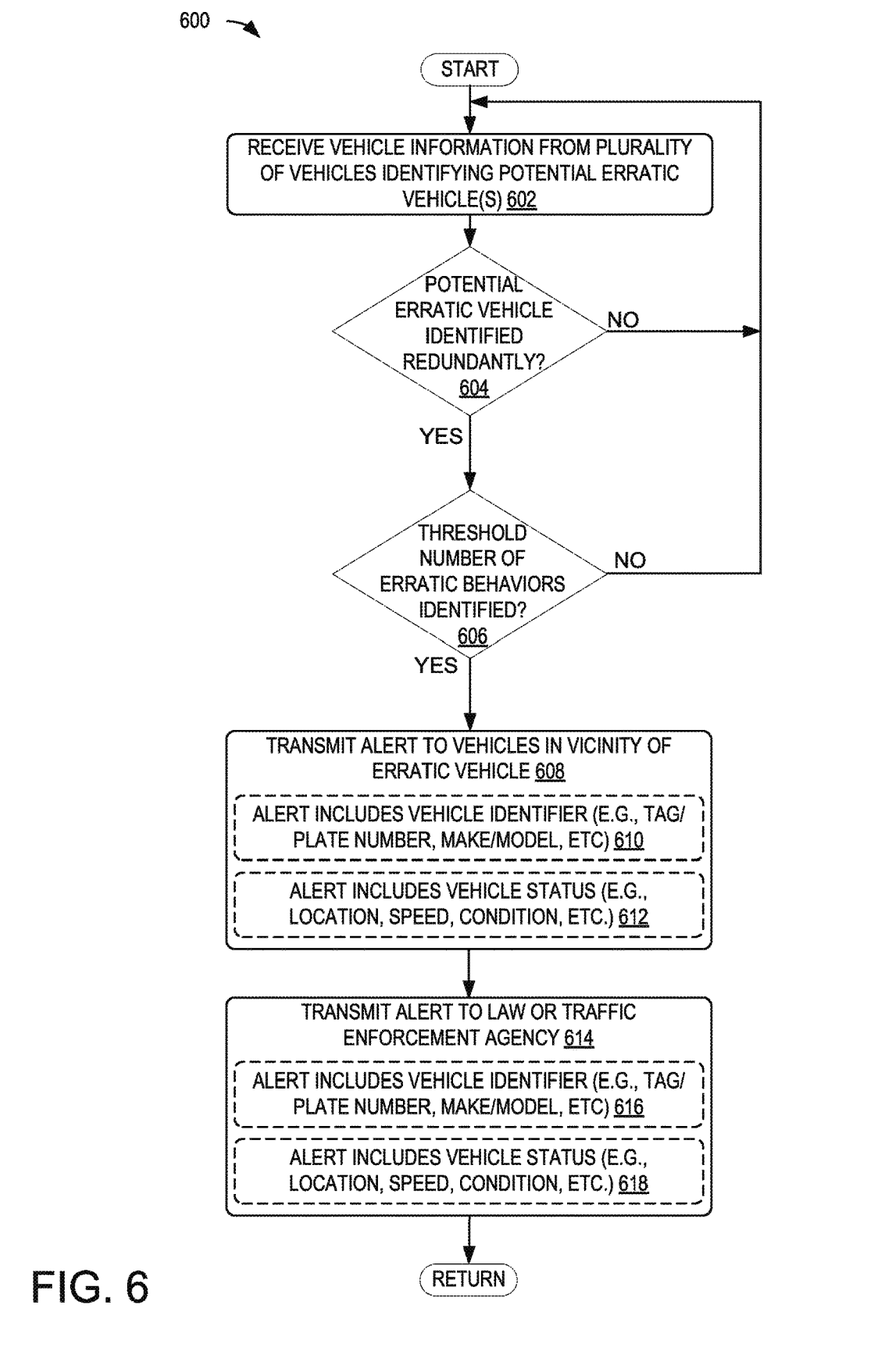
FIG. 6 is a flow chart of a method of receiving vehicle information and verifying erratic behavior at a server system in accordance with one or more embodiments of the present disclosure.

FIG. 6 is a flow chart of a method 600 of receiving vehicle information and verifying erratic behavior at a server system. The method 600 may be performed by any suitable device or combination of devices, including but not limited to an extra-vehicle server, a mobile device within and/or remote to a particular vehicle, and/or an in-vehicle system. At 602, the method 600 includes receiving vehicle information from plurality of vehicles (e.g., observing vehicles) identifying potential erratic vehicle(s). At 604, the method 600 includes determining if a potential erratic vehicle is identified redundantly. For example, a potential erratic vehicle may be identified redundantly when a threshold number of vehicles (or a number of vehicles that meets the threshold) identifies the same vehicle (e.g., based on a license plate or other vehicle identifier) as a potential erratic vehicle and/or as exhibiting one or more erratic driving behaviors. If a potential erratic vehicle is not identified redundantly (e.g., identified by only one vehicle and/or identified by fewer vehicles than a threshold, "NO" at 604), the method 600 returns to 602 to continue receiving vehicle information. Conversely, if a potential erratic vehicle is identified redundantly (e.g., "YES" at 604), the method 600 proceeds to 606 to determine if a threshold number of erratic behaviors are identified for the particular potential erratic vehicle. As described above, the threshold number of erratic behaviors may be predetermined and/or may vary based on dynamic characteristics, such as observing vehicle operating conditions/environmental conditions.

If the threshold number of erratic behaviors is not identified (e.g., "NO" at 606), the method 600 returns to 602 to continue receiving vehicle information. Conversely, if at least the threshold number of erratic behaviors is identified (e.g., "YES" at 606), the server may consider the potential erratic vehicle as a verified erratic vehicle and the method 600 proceeds to 608 to transmit an alert to vehicles in a vicinity of the erratic vehicle. As indicated at 610, the alert may include a vehicle identifier, such as a tag/plate number, make/model, etc., and/or a vehicle status, such as a location, speed, condition, etc. of the erratic vehicle, as indicated at 612. The method 600 may further include transmitting an alert to a law or traffic enforcement agency at 614. The alert may include the same or different information from the alert sent to vehicles in the vicinity of the erratic vehicle. The alert may include a vehicle identifier, as indicated at 616 and/or a vehicle status, as indicated at 618.

By leveraging image data captured by a camera mounted on a vehicle, an in-vehicle computing system in communication with a server may identify erratic behaviors from neighboring vehicles traveling in a vicinity of the vehicle. Automatically transmitting information regarding erratic behaviors and associated vehicles from an observing vehicle to a server for further processing and/or verification enables the server to notify a law or traffic enforcement agency, as well as other drivers in the vicinity of the erratic vehicle that dangerous conditions are present without distracting the driver of the observing vehicle. In this way, corrective measures may be taken by the driver of an observing vehicle and/or by law or traffic enforcement agencies to avoid accidents stemming from erratic behaviors of a vehicle.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 300 and/or server 420 described with reference to FIGS. 3 and 4. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:
1. An in-vehicle computing system for a vehicle, comprising:
a processor;
a sensor subsystem communicatively coupleable to a camera mounted on the vehicle;
an external device interface communicatively coupleable to an extra-vehicle device located externally from each of the vehicle, the sensor subsystem, and the camera; and
a storage device storing instructions executable by the processor to:
monitor, with the sensor subsystem, neighboring vehicles within a field of view of the camera;
image potential erratic behavior of an imaged vehicle via the camera;
identify, with the processor, the imaged vehicle as a potential erratic vehicle based on the imaged potential erratic behavior, wherein identifying the potential erratic vehicle includes identifying, with the processor using information from the sensor subsystem, a behavior of each of the neighboring vehicles and comparing, with the processor, the behavior of each of the neighboring vehicles to the potential erratic behavior of the potential erratic vehicle; and
automatically transmit, via the external device interface, vehicle information from the in-vehicle computing system for the vehicle to the extra-vehicle device located externally from the vehicle, the vehicle information indicating the imaged potential erratic behavior of the potential erratic vehicle.

2. The in-vehicle computing system of claim 1, wherein identifying the potential erratic vehicle includes determining one or more driving characteristics of each neighboring vehicle including speed, erratic acceleration, frequent braking, and driving patterns of each neighboring vehicle, and then automatically transmitting, without distracting a driver of the vehicle, the one or more driving characteristics to the extra-vehicle device in coordination with an identifier of the potential erratic vehicle.

3. The in-vehicle computing system of claim 1, wherein identifying the potential erratic vehicle further includes sending image data from the camera to an external device located remotely from the in-vehicle computing system, the external device running an application configured to analyze the image data and identify the potential erratic vehicle based on the image data.

4. The in-vehicle computing system of claim 1, wherein the extra-vehicle device is an extra-vehicle server, and wherein the instructions are further executable by the processor to identify a type of roadway on which the potential erratic vehicle is traversing and a type of indicator of the potential erratic vehicle, and transmit the identified type of roadway and the type of indicator to the extra-vehicle server in association with a vehicle identifier for the potential erratic vehicle, then receive an alert confirming that the potential erratic vehicle is verified as an erratic vehicle responsive to the extra-vehicle server comparing the vehicle identifier with vehicle identifiers received from one or more other observing vehicles and determining that a threshold number of observing vehicles identified the potential erratic vehicle, the threshold number of observing vehicles being based at least on the type of roadway on which the observing vehicles are traversing when observing the potential erratic vehicle.

5. The in-vehicle computing system of claim 1, wherein the extra-vehicle device is a mobile device, and wherein the instructions are further executable by the processor to receive an alert identifying an erratic vehicle identified by another neighboring vehicle.

6. The in-vehicle computing system of claim 1, wherein the camera includes a camera system comprising a rear-facing camera and at least one additional camera, and wherein the instructions are executable by the processor to identify the imaged vehicle as the potential erratic vehicle based on observing a threshold number of indicators of the imaged potential erratic behavior, wherein each of the indicators of the imaged potential erratic behavior is weighted relative to other indicators.

7. The in-vehicle computing system of claim 1, further comprising a Controller Area Network (CAN) stack communicatively connected to an electronic control unit for the camera via a CAN bus of the vehicle, the CAN stack configured to provide instructions to control operation of the camera, wherein at least the processor and the external device interface form an integrated head unit installed in an instrument panel of a cabin of the vehicle.

8. The in-vehicle computing system of claim 1, wherein the vehicle information includes, in addition to the vehicle information indicating the imaged potential erratic behavior, a vehicle identifier for the potential erratic vehicle and/or a vehicle status or condition of the potential erratic vehicle.

9. The in-vehicle computing system of claim 8, wherein the vehicle identifier includes one or more of a plate number, a make of the potential erratic vehicle, a model of the potential erratic vehicle, and a color of the potential erratic vehicle, and wherein the vehicle condition of the potential erratic vehicle includes one or more of a tire puncture, an incompletely closed door, a shifting vehicle load, and a non-functioning light.

10. The in-vehicle computing system of claim 8, wherein the vehicle status includes one or more of a location and speed of the potential erratic vehicle, wherein identifying the potential erratic vehicle further comprises identifying the potential erratic vehicle as being potentially erratic based at least on the vehicle status, and wherein transmitting the vehicle information to the extra-vehicle device comprises transmitting the vehicle status to the extra-vehicle device.

11. An in-vehicle computing system for a vehicle, comprising:
a processor;
a sensor subsystem communicatively coupleable to a camera mounted on the vehicle;
an external device interface communicatively coupleable to an extra-vehicle server that is separate from the vehicle and located externally from each of the vehicle, the sensor subsystem, and the camera; and
a storage device storing instructions executable by the processor to:
for each neighboring vehicle within a field of view of the camera, control the camera, via the sensor subsystem, to capture at least one frame of image data including a license plate of the neighboring vehicle;
control the camera, via the sensor subsystem, to capture a stream of image data indicating one or more driving behaviors exhibited by each neighboring vehicle within the field of view of the camera;
compare, with the processor, the one or more driving behaviors to driving behaviors exhibited by the vehicle and/or one or more other neighboring vehicles;
identify, with the processor, a potential erratic vehicle of the neighboring vehicles based on the stream of image data and the one or more driving behaviors;
automatically transmit, via the external device interface, vehicle information corresponding to the potential erratic vehicle to the extra-vehicle server, the vehicle information including an identifier presented on the license plate of the potential erratic vehicle and the one or more driving behaviors exhibited by the potential erratic vehicle;
receive, from the extra-vehicle server via the external device interface, an alert identifying the potential erratic vehicle as a confirmed erratic vehicle responsive to the extra-vehicle server determining that a threshold number of observing vehicles identified the potential erratic vehicle based on the one or more driving behaviors of the potential erratic vehicle; and
present, via an output device, the alert identifying the potential erratic vehicle as the confirmed erratic vehicle to a driver.

12. The in-vehicle computing system of claim 11, wherein the output device comprises a display of the vehicle and/or one or more speakers of the vehicle, the in-vehicle computing system further comprising a frame grabber communicatively connected to the camera and configured to receive the stream of image data from the camera and separate the stream of image data into individual frames.

13. The in-vehicle computing system of claim 12, further comprising a video analytics module configured to analyze the individual frames from the frame grabber to determine the one or more driving behaviors, wherein the one or more driving behaviors includes frequent lane changes, and identifying the potential erratic vehicle further comprises determining that a number of times the potential erratic vehicle changed lanes exceeded a threshold above an average number of times each of the neighboring vehicles changed lanes.

14. A method of identifying a potential erratic vehicle within a field of view of a camera of a vehicle, the method comprising:
   receiving, at an extra-vehicle server external to the vehicle, vehicle information for a potential erratic vehicle, the vehicle information including an indication of an erratic behavior of the potential erratic vehicle as identified by at least the vehicle and a type of a roadway on which the potential erratic vehicle is traversing;
   determining, with the extra-vehicle server, a number of observing vehicles from which vehicle information for the potential erratic vehicle is received; and
   responsive to determining that the number of observing vehicles is above a threshold number of observing vehicles, generating and transmitting an alert to one or more vehicles in a geographical vicinity of the potential erratic vehicle confirming that the potential erratic vehicle is verified as an erratic vehicle.

15. The method of claim 14, wherein the alert from the extra-vehicle server includes a vehicle identifier and a vehicle status of the erratic vehicle, and wherein the one or more vehicles in the geographical vicinity of the potential erratic vehicle are determined to be within a threshold distance of a last known location of the verified erratic vehicle, the threshold distance being based on a determined speed of the verified erratic vehicle.

16. A method of identifying a potential erratic vehicle within a field of view of a camera of a vehicle, the method comprising:
   receiving, at an extra-vehicle server external to the vehicle, vehicle information for a potential erratic vehicle, the vehicle information including an indication of an erratic behavior exhibited by the potential erratic vehicle as identified by at least the vehicle;
   determining, with the extra-vehicle server, a number of observing vehicles from which vehicle information for the potential erratic vehicle is received; and
   responsive to determining that the number of observing vehicles is above a threshold number of observing vehicles, generating and transmitting an alert to one or more vehicles in a geographical vicinity of the potential erratic vehicle confirming that the potential erratic vehicle is verified as an erratic vehicle;
   the method further comprising determining, with the extra-vehicle server, a number of erratic behaviors identified for the potential erratic vehicle, and wherein the alert is transmitted to the one or more vehicles responsive to determining that a threshold number of erratic behaviors is identified by the vehicle.

17. The method of claim 16, wherein the threshold number of erratic behaviors is based on one or more of a vehicle operating condition and an environmental condition.

18. The method of claim 14, wherein the threshold number of observing vehicles is based on one or more of the type of the roadway that the observing vehicles are traversing and a traffic condition on the roadway.

19. The in-vehicle computing system of claim 1, wherein monitoring neighboring vehicles within the field of view of the camera includes capturing image data including a number plate of each neighboring vehicle within the field of view of the camera to identify each neighboring vehicle and, for each identified neighboring vehicle, capturing a stream of image data imaging the identified neighboring vehicle over time.

20. The in-vehicle computing system of claim 1, wherein identifying the potential erratic vehicle includes determining that the image data provides evidence that the potential erratic vehicle is erratically overtaking one or more other vehicles.

21. The in-vehicle computing system of claim 13, further comprising an event generator configured to generate a signal indicating a presence of the potential erratic vehicle and/or associated details based on data received at the event generator from the video analytics module.

* * * * *